United States Patent [19]

Baker

[11] Patent Number: 5,320,316
[45] Date of Patent: Jun. 14, 1994

[54] PORTABLE STANDS OR SUPPORTS

[75] Inventor: Harry J. Baker, Pinner, United Kingdom

[73] Assignee: Ronford-Baker Engineering Co., Ltd., United Kingdom

[21] Appl. No.: 939,604

[22] Filed: Sep. 2, 1992

[30] Foreign Application Priority Data

Sep. 14, 1991 [GB] United Kingdom ............... 9119679

[51] Int. Cl.⁵ ............................................. F16M 11/00
[52] U.S. Cl. ................................ 248/163.1; 248/188.5
[58] Field of Search ............... 248/163.1, 163.2, 432, 248/188, 188.1, 188.5, 170, 439, 173, 440.1, 177, 178, 179, 188.6, 316.2, 231.3; 354/81, 293

[56] References Cited

U.S. PATENT DOCUMENTS 1,394,691 10/1921 Spence, Jr.
2,534,659 12/1950 Cardona.
3,201,080 8/1965 Rose ................................ 248/188.5
4,192,076 3/1980 Hall .............................. 248/163.1 X
4,767,090 8/1988 Hartman et al. .................. 248/188 X

FOREIGN PATENT DOCUMENTS 8812402 12/1988 Fed. Rep. of Germany.
3805260 8/1989 Fed. Rep. of Germany.
1157990 10/1967 United Kingdom.

OTHER PUBLICATIONS

European Search Report, Dec. 1992.

Primary Examiner—Ramon O. Ramirez
Attorney, Agent, or Firm—Christie, Parker & Hale

[57] ABSTRACT

An extensible support leg for a portable stand or support, in particular a tripod, comprises a plurality of pairs of parallel elongate leg members arranged in two or more planes, adapted such that the leg is extensible by relative sliding movement between pairs in respective first and second planes, and means for releasably locking the leg members in any desired position, each pair of leg members being spaced apart at their ends by rigid spacers, forming a box-sectioned portion, at least one of said spacers having through holes for slidably receiving a second pair of leg members.

19 Claims, 6 Drawing Sheets

PORTABLE STANDS OR SUPPORTS

CROSS REFERENCE TO RELATED APPLICATION

This application is related to design patent application Ser. No. 07/850,792 filed on Mar. 13, 1992.

BACKGROUND OF THE INVENTION

This invention relates to portable stands or supports. In particular, it relates to stands or supports of the type on which a film camera, lighting or other apparatus can be mounted. Such stands are generally in the form of tripods, which provide the most stable support but may alternatively be monopods, bipods or having any other number of legs.

DESCRIPTION OF THE PRIOR ART

It is often desirable that such a stand or support be adjustable in height. Previously available stands have only had a limited amount of adjustability. Therefore, in situations wherein it is considered that a large amount of height adjustment may be necessary, such as during electronic news gathering (ENG) operations, an operator will often take two different stand apparatuses, a first one having a first height adjustment and a second one having a second height adjustment. This increases the amount of equipment necessary and is clearly undesirable when speed and manoeuvrability are required by the camera or other equipment and its operator to follow a particular series of events.

So called "two-stage" tripods or other supports have previously been proposed to overcome this problem. However, each of the previous proposals have certain disadvantages. Some of them are too bulky and heavy for use in electronic news gathering. In some, the two-stage operation is achieved by telescoping certain members into other members. This telescoping mechanism can relatively easily be jammed, particularly by the entry of foreign bodies such as dust particles into the mechanism. Thus, operation of such devices is difficult in adverse terrains such as deserts. Rigidity can also be a problem with two-stage support devices. When used with a camera it is essential that the supports be absolutely rigid so that long exposure shots may be taken.

SUMMARY OF THE INVENTION

According to the present invention there is provided an extensible support leg comprising a plurality of pairs of parallel elongate leg members arranged in two or more planes, adapted such that the leg is extensible by relative sliding movement between pairs in respective first and second planes, and means for releasably locking the leg members in any desired position.

Preferably, each pair of leg members is spaced apart at their ends by rigid spacers, forming a box-sectioned portion, at least one of said spacers having through holes for slidably receiving a second pair of leg members.

According to the present invention in a further aspect there is provided an extensible support leg for a portable stand or support which includes a first leg part having clamping means secured thereto, the clamping means comprising a body portion having at least two spaced retaining holes passing therethrough, each retaining hole slidably receiving an extension member, the extension members being substantially parallel and providing a second leg part; the body portion defining a housing which is located between the retaining holes and receives a locking member, the locking member having two planar abutment surfaces forming angles of less than 90° with the longitudinal axis thereof and being located in the housing and capable of longitudinal adjustment within the housing; the housing communicating with each retaining hole through one of a plurality of internal passages provided in the body portion within each of which passages is slidably located a clamping member having a planar surface having a complementary angle to an abutment surface for engaging the respective abutment surface, each clamping member having a length greater than the length of the internal passage in which it is located; wherein the second leg part can be clamped relative to the first leg part by longitudinal adjustment of the locking member relative to the body portion to cause the abutment surfaces of the locking member to engage and slide over the respective abutment surfaces of the clamping members to urge said members towards their respective retaining holes and to thereby clamp the extension members in their respective retaining holes.

The locking member is preferably floatingly located in the housing, and may be of trapezoidal shape having at least two abutment surfaces forming the tapered sides thereof.

The clamping members preferably act upon shoes which clamp the extension members. The clamping members may be supported for relative rotation about their longitudinal axis, and therefore with respect to the shoes and the trapezoidal block, so that longitudinal adjustment of the block causes rotational adjustment of the clamping members to abuttingly align the planar surfaces.

The clamping surfaces may be supported by the shoes by a spigot and recess, there being a tolerance between the spigot and recess diameters, to allow relative rotation of the spigot and recess, and therefore relative rotation of the shoe and clamping member. The clamping member may be otherwise floating within the housing.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
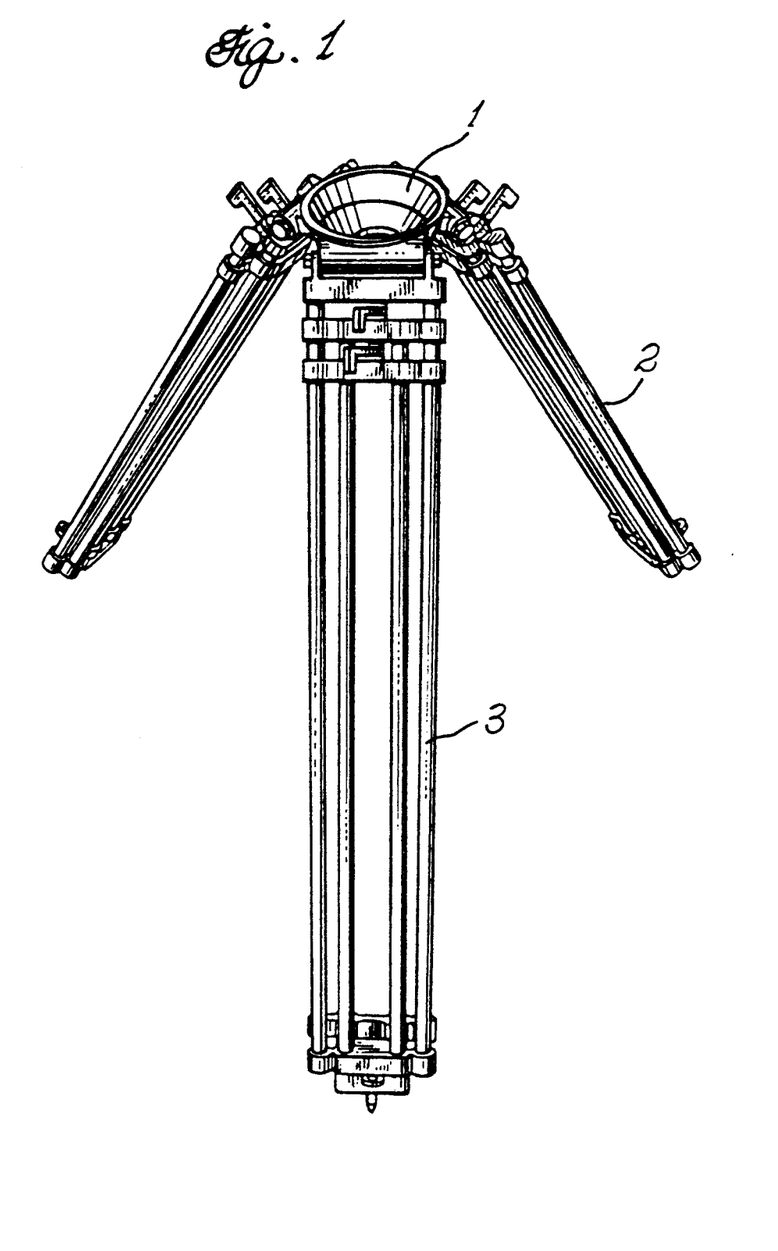
FIG. 1 shows a stand or support in the form of a tripod in its retracted, lowest height, position.

Referring to FIG. 1, a two-stage tripod comprises a mounting or head 1 for receiving a camera or other apparatus hingeably mounted to three leg portions 2. The leg portions 2 each comprise a plurality of tubular leg members or struts 3. These are spaced apart and interconnected such that they all lie parallel and spaced apart and so that at least some of the leg parts 3 can slide axially with respect to the other parts to the lengthen or shorten a leg to raise or lower the support member 1 from the ground. Each leg part 2 contacts a ground surface by means of one or more spikes 48 shown more clearly in FIGS. 6 and 7. It is well-known that a tripod structure is the most stable but the invention is equally applicable to other structures such as monopods or four-legged ones for example.

Figure 2:
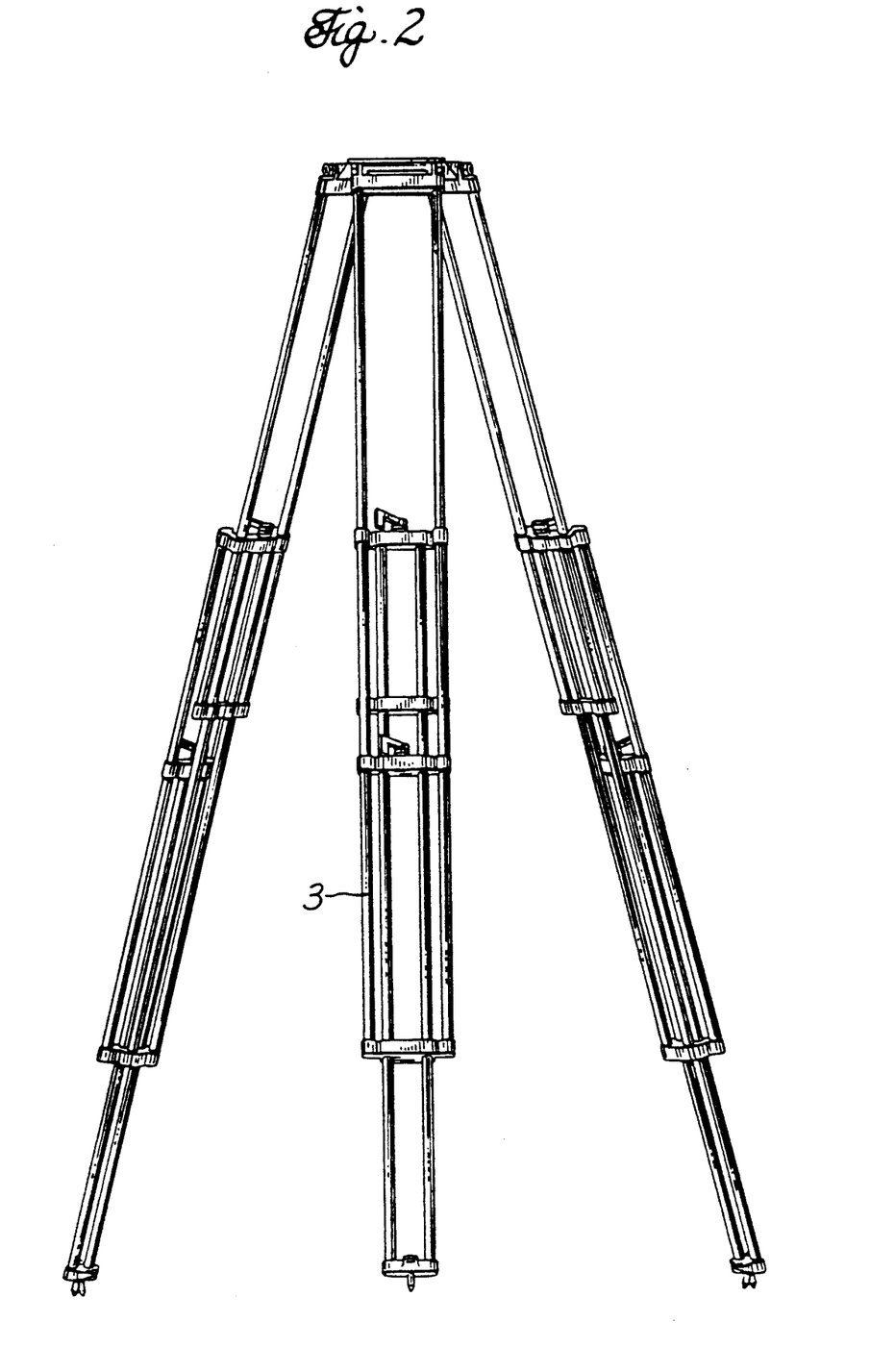
FIG. 2 shows the tripod in an intermediate position.
Figure 3:
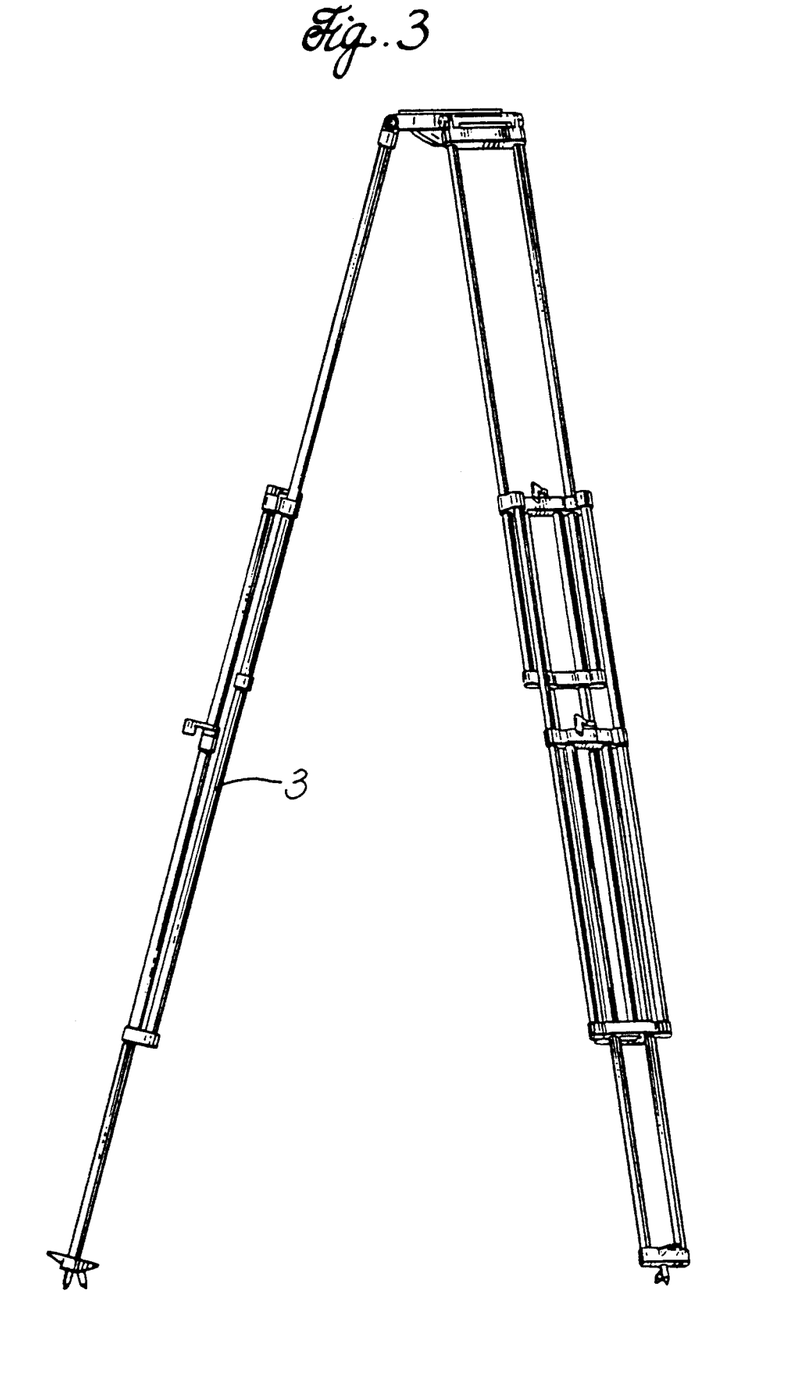
FIG. 3 shows a side view of the tripod in the intermediate position with one leg omitted for clarity.

The tripod shown is a two-stage tripod, that is there are two stages involved in the height adjusting mechanism for each leg. As shown in FIGS. 2 and 3, this mechanism involves the relative sliding in an axial direction of respective pairs of strut members 3.

Figures 4, 5A, 5B:
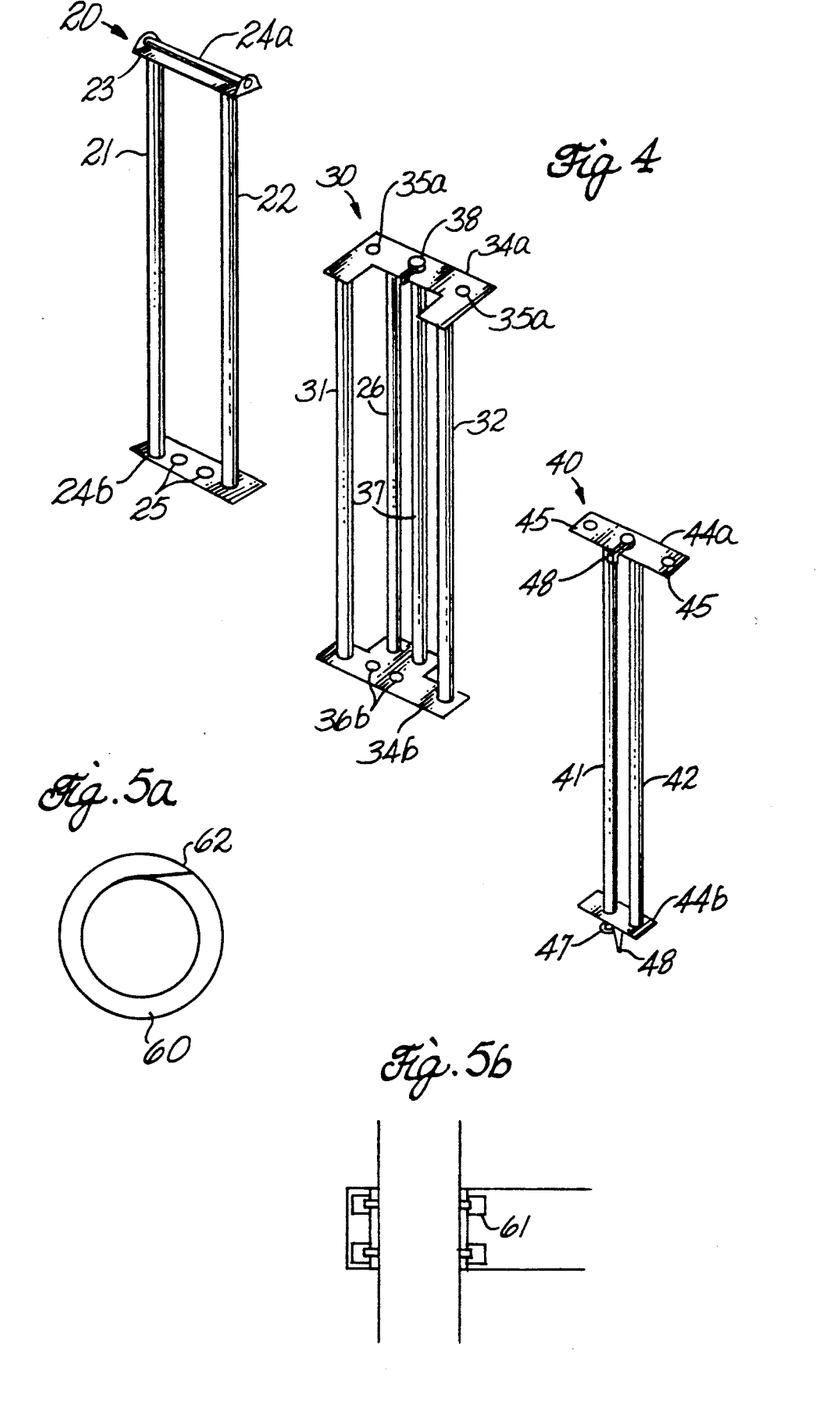
FIG. 4 shows a detail of one of the legs of the tripod separated into its component parts.
FIGS. 5a and 5b show part of a sliding mechanism.

Each leg comprises three parts which are adapted to slide with respect to one another. These parts are shown in FIG. 4 as 20, 30 and 40. Each part comprises at least one pair of parallel tubular struts or leg members which may be made of a light alloy, or a strong plastics material for example. The struts are spaced apart at their ends by spacer bars which serve to make a strong box-sectioned structure for maximum stability and strength.

The first part 20 which is adapted to be radially innermost on an assembled tripod structure comprises two parallel tubes or rods 21 and 22, typically spaced so as to lie approximately 8.5 cm apart between their longitudinal axes, by means of two spacers 24a and 24b, one at each end, to which the bars are securely fitted. The bars may be screwed in place or otherwise fitted, perhaps by the use of adhesive. Top bar 24a mounts a rotatable rod 23 which can be used to mount the leg to a head and to other legs of a tripod in conventional manner. Bar 24 includes two through holes 25 which are mounted in colinear manner with the bars 21 and 22. The tubular members 21 and 22 are typically of approximately 1.2 cm diameter. They are made of a material which is strong and is substantially resistant to significant flexing in the transverse direction.

Part 30 comprises two parallel pairs of legs 31, 32 and 36, 37. The legs are secured and spaced apart by respective top and bottom spacers 34a and 34b. As shown, tubular members 31 and 32 lie towards the front of the part and are spaced approximately 8.5 cm apart, i.e. the same spacing as the legs 21, 22 of part 20. Parts 36 and 37 lie in a plane approximately 2 cm behind the first plane and are spaced apart by approximately 4 cm. Spacer bar 34a is generally U-shaped in plan view and bars 31 and 32 are secured to the underside of the leg parts of the U whilst 36 and 37 are secured to the back part thereof. Through holes 35a are formed towards the rear edges of the U as shown. Spacer 34a includes a locking mechanism as will be described further below so that it can lock tubular members sliding with respect to apertures 35a into any desired position. The locking mechanism includes a locking lever 38. Bottom spacer 34b is of T-shape in plan view, with the cross-piece of the T being towards the front and supporting the two front members 31 and 32 towards its edges and the stem being towards the rear and supporting bars 36 and 37. Through holes 35b are formed in the T-shaped spacer positions generally colinear with bars 31 and 32.

Part 40 comprises a single pair of tubular parallel members spaced approximately 4 cm apart (i.e. the same spacing as tubes 36,37). The top spacer of this part 44a is of approximately the same length as the top spacers 24a and 34a and is a locking bar, having a locking mechanism similar to that of part 34a and having a locking lever 48. Spacer 44a is provided with two through holes 45 in which a relatively sliding tubular bar can be locked in any desired position. Bottom spacer 44b includes a front eye portion 47 and two spikes 48 adapted to rest against the ground when the leg is in operation.

The assembled structure of the leg will now be described.

The tubular leg parts are preferably assembled in place and the respective spacer bars secured thereto progressively by screwing through screw holes on the side of the spacer bars. Once the entire assembly operation has been completed, the structure is as follows. Tubes 21 and 22 extend through through-holes 35a in part 30. Thus, tubes 36 and 37 of part 20 lie colinear with tubes 21 and 22 and tubes 31 and 32 lie in front of the plane formed by legs 21, 22, 36 and 37. Tubes 21 and 22 are slidably displaceable with respect to through holes 35a and can be locked at any desired position by the locking mechanism described below. Tubes 31 and 32 are in turn mounted within, and therefore slidably displaceable with respect to, through holes 45 in part 40. Again, since this is a locking part, the relative position of parts 30 and 40 can be varied and locked at will. Thus, the height of the leg can be adjusted in a two stage mechanism involving firstly displacement of part 30 with respect to part 20 and secondly displacement of part 40 with respect to part 30.

The rear tubes 36 and 37 of part 30 pass through apertures 25 in part 20 and tubes 41 and 42 of part 40 pass through apertures 36b of part 30. Thus, it will be clear that each tubular part of the structure is secured at either end to a spacer which is fixed with respect to that tube but is also slidably displaceable through a spacer belonging to another part. Accordingly, at any time a series of box sections in two planes are formed, leading to a strong structure.

A two stage mechanism is described above, however, further stages may be added if necessary, either by keeping the biplanar structure or by adding third or further planes. This tends to increase complexity however and usually two stages of movement are sufficient.

Where a tube passes through a through-hole and is intended to be slidably displaceable with respect thereto, low friction rings 60 (FIG. 5) are mounted in radial grooves 61 in a spacer bar. The rings are typically made of nylon or another suitable plastics or other material and are split as shown at 62. This split starts at the inner face of the ring and is generally tangential thereto and extends to the outside thereof. Such a split tends to make the ring try to close and therefore the ring tightly grips a tube sliding within it. Hence, during relative movement of the tube and the ring the tube is wiped by the ring, thus providing a cleaning action. The ring also prevents the ingress of particulate material such as sand or ice, enabling the leg and support stand to be used in environments which were previously considered too hostile, such as deserts or arctic regions. As shown in FIG. 5(b) the radial grooves 61 may, in some embodiments, be of greater depth than the diameter of a ring 60. The locking mechanism described below tends to push a tube laterally outwards from the longitudinal axis of the leg. Thus, when a leg is locked, the nylon ring is pushed into the groove and the side of the tube abuts directly against the metal or other material surface of the spacer, providing a firmer joint.

Figure 6:
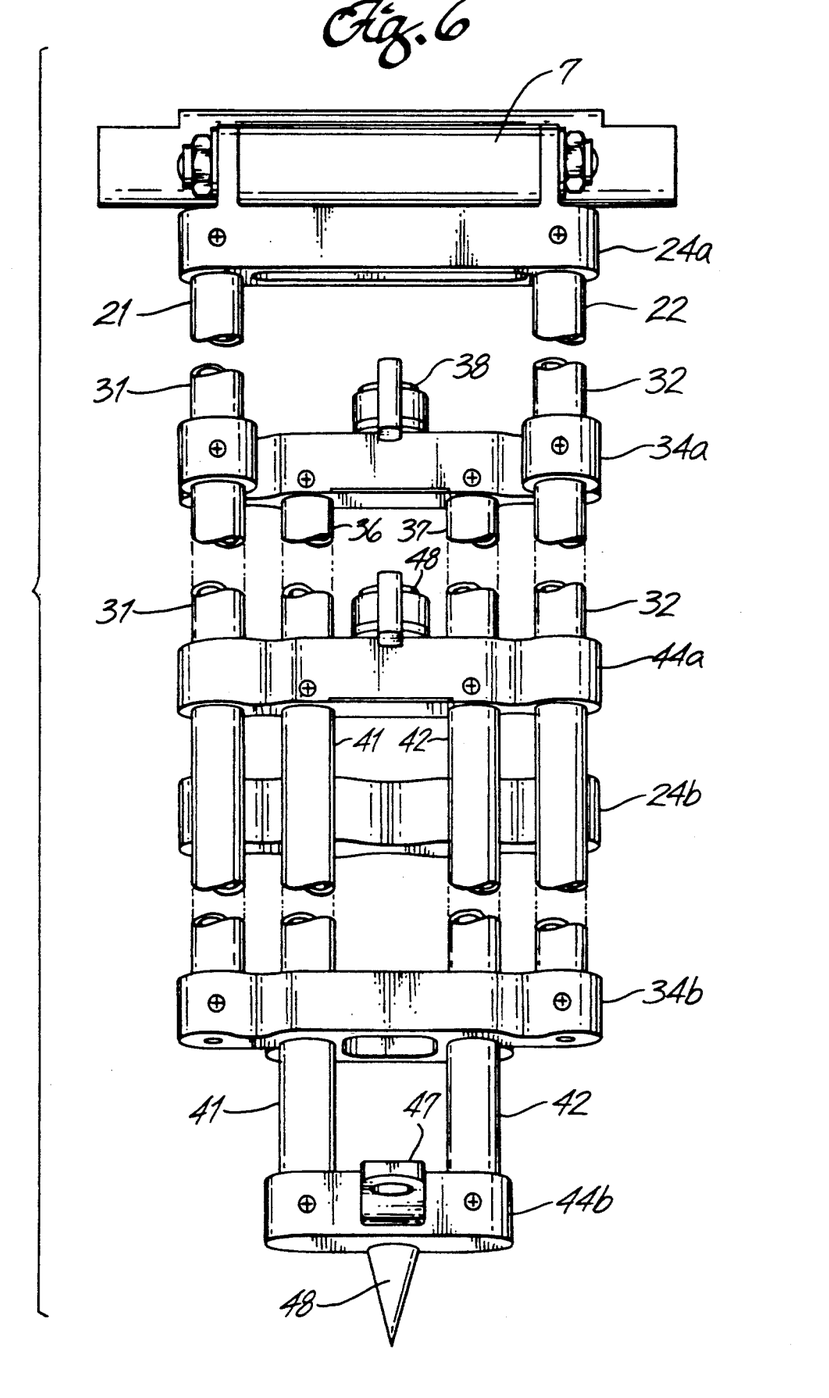
FIGS. 6 shows a schematic front view of parts of a leg.

FIG. 6 shows a schematic front view of an assembled leg. This figure shows in more detail how the parts are assembled together and shows how from top to bottom the spacers would be assembled in the order 24a, 34a, 44a, 24b, 34b and 44b. This relative disposition will always be maintained no matter what the degree of extension. It should be noted that the tubes lie in two planes, one underneath the other in the figure. For instance, tubes 36 and 37 extend behind tubes 41 and 42, similarly tubes 21 and 22 extend behind tubes 31 and 32.

Figures 7, 8:
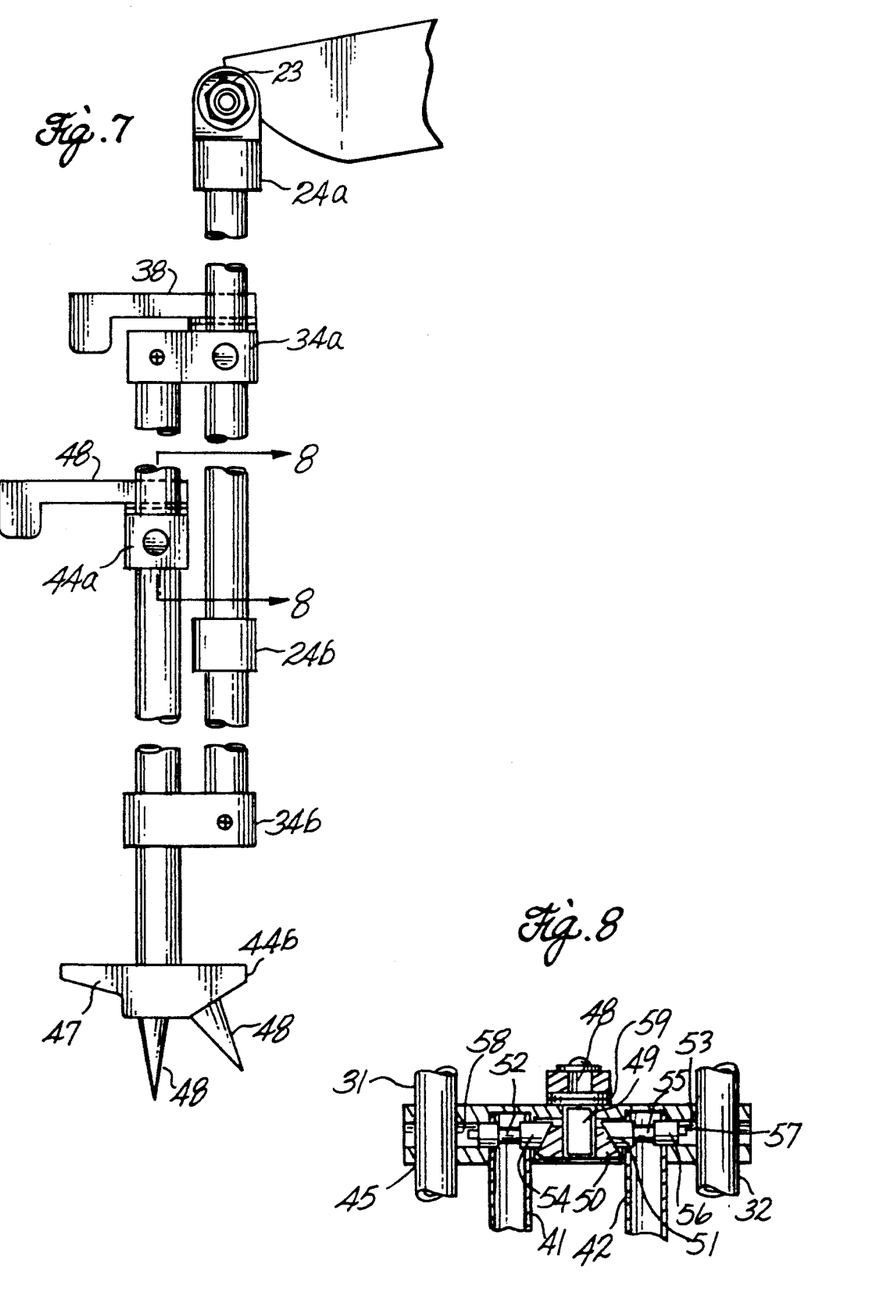
FIG. 7 shows a side view of the leg of FIG. 5.
FIG. 8 is a cross section through A—A of FIG. 7 showing a locking mechanism.

FIG. 7 illustrates a side view of FIG. 6, showing more clearly the two planes and how the various box sections are constructed.

FIG. 8 shows a cross section through the lockable space bar 48, illustrating the locking mechanism. As shown, the locking lever 48 is mounted on the end of a shaft 49. The shaft is adapted to act upon a trapezoidal block 50, to raise or lower the block with respect to the housing. The block 50 is square or rectangular in plan view and is disposed in an opening in the bar 44a with a clearance between the opening and the block such that the block is to some extent floating in the opening and can, together with shaft 49, tilt about the horizontal axis into the paper in the figure. Block 50 has tapered planar side edges 51 which are adapted to abut against respective clamping members 52, which have wedge shaped portions 54 at one end, having correspondingly tapered, planar, edges to block 50. Wedge portions 54 are connected via rods 55 to end pieces 56, having an end spigot 57. Members 52 are arranged for longitudinal displacement through respective internal passages 53, which communicate with the through holes 45, for receiving tubular members 31 and 32. Spigot 57 locates inside a corresponding shaped recess in a shoe 58, which may be of nylon in one embodiment. Shoe 58 acts upon a tube 31 or 32 in through hole 45 to lock the tube with respect to spacer 44a. The tube contacting surface of the shoe may have a correspondingly arcuate surface to the tube wall, ensuring a surface, rather than point, contact.

Locking lever 48 acts in one embodiment to rotate shaft 49 by approximately a quarter turn between its fully unlocked and fully locked position. Lever 48 is spaced from the spacer bar 44a by one or more washers 59, and in the locked position (shown in FIGS. 6, 7 and 8) extends perpendicularly to the longitudinal axis of the leg. Shaft 49 acts to raise block 50 when rotated. This may be done by cooperating screwthreads or by a cam action. For example, the shaft may have an elliptic or other eccentric cross-section over part or all of its length, which cooperates with an internal profile of the block, to raise or lower the block, and hence to cause the floating block to move into abutment with wedge portions 54 and subsequently to cause longitudinal outward displacement of members 52 to lock tubes 31 and 32. Alternatively, the shaft 49 may have one or more flats or planar portions on its periphery, acting in cooperating with the internal surface of block 50.

The floating nature of block 50 enables variations in the spacing of the tubular member, for example, to be compensated for, since the block will automatically center the mechanism when drawn into a locking position. It can also compensate for unevenness on a tube surface, caused by dust for example. Since a planar contact occurs between faces of block 50 and wedges 54, the pressure is distributed over the contacting faces and the mechanism tends to wear far slower than in conventional locking systems which use point contact between curved or conical bodies.

In a preferred embodiment, the clamping members 52 are also floating, so that the spigots 57 only loosely fit into recesses in shoes 58, allowing for rotation of the clamping member about its longitudinal axis. Thus, wedge piece 54 can rotate with respect to trapezoidal block 50. In use, when block 50 is drawn upwards, wedge 54 will automatically be rotated into abutting planar alignment with block 50 to clamp a tubular member 31 or 32. This avoids the need for accurate angular alignment of the clamping member and shoe, as was required in a previously proposed locking mechanism which usually involved placing the mechanism in a complex jig for alignment. In this embodiment of the present invention, the clamping members 52 automatically self-align with respect to the block 50 upon actuation of block 50, since they are rotably supported with respect to shoe 58, and block 50. The self-alignment ensures that both clamping members are aligned, and both are displaced to tightly grip a respective tubular member. In systems where pre-alignment is necessary, it is sometimes found that one tube is tightly gripped, but the other is gripped more loosely, allowing for slippage and loss of rigidity.

It should be noted that the locking lever need not be mounted on the top surface of the mechanism. By rotating the mechanism about the axis of the clamping member 52, the lever could alternatively be mounted on the front, bottom or rear of the mechanism. In one example, the lever is mounted on the front. This can reduce the possibility of the lever inadvertently being turned from a locked to an unlocked position, for example. The protruding locking lever may be replaced by other actuators, such as rotating knobs, or sliding devices for example performing the same function of causing relative motion of the trapezoidal block 50 and wedges 54.

I claim:

1. An extensible support leg for a portable stand or support comprising a plurality of pairs of parallel elongate leg members arranged in two or more planes, adapted such that the leg is extensible by relative sliding movement between pairs in respective first and second planes, and means for releasibly locking the leg members in any desired position, the leg comprising a first leg part formed by a pair of parallel leg members in said first plane, a second leg part formed by a pair of parallel leg members in a second plane, and a third leg part formed by a pair of parallel leg members in said second plane, wherein the extensible support leg is assembled by interconnecting the first leg part with the second leg part and the second leg part with the third leg part, the first leg part including two spacers, one spacer having through holes for slidably receiving the pair of parallel leg members in the first plane of the second leg.

2. An extensible support leg as claimed in claim 1 wherein each pair of leg members is spaced apart at their ends by rigid spacers, forming a box-sectioned portion, at least one of said spacers having through holes for slidably receiving a second pair of leg members.

3. An extensible support leg as claimed in claim 1 wherein the second leg part includes two spacers, one spacer having through holes for slidably receiving the pair of parallel leg members in the first plane of the first leg part and having means for releasably locking said pair of parallel leg members in any desired position with respect to the second leg part, and the second spacer having through holes for slidably receiving the pair of parallel leg members in the second plane of the third leg part.

4. An extensible support leg as claimed in claim 3 wherein the third leg part includes two spacers, one spacer having through-holes for slidably receiving the pair of parallel leg members in the second plane of the second leg part and having means for releasably locking said pair of parallel leg members in any desired position with respect to the third leg part.

5. An extensible support leg as claimed in claim 2 wherein the spacers having through holes are provided with at least one ring fitted within a corresponding shaped radial groove in the hole defining area of the spacer.

6. An extensible support leg as claimed in claim 5 wherein the radial groove has a diameter greater than the diameter of the ring such that there is a tolerance therebetween.

7. An extensible support leg as claimed in claim 5 wherein the ring is split.

8. An extensible support leg as claimed in claim 7 wherein the split starts at the inner face of the ring and is generally tangential thereto.

9. An extensible support leg as claimed in claim 5, wherein the ring is made of a low friction plastics material.

10. An extensible support leg including a first leg part having clamping means secured thereto, the clamping means comprising a body portion having at least two spaced retaining holes passing therethrough, each retaining hole slidably receiving an extension member, the extension members being substantially parallel and providing a second leg part; the body portion defining a housing which is located between the retaining holes and receives a locking member, the locking member having two planar abutment surfaces forming angles of less than 90° with the longitudinal axis thereof and being located in the housing and capable of longitudinal adjustment within the housing; the housing communicating with each retaining hole through one of a plurality of internal passages provided in the body portion within each of which passages is slidably located a clamping member having a planar surface having a complementary angle to an abutment surface for engaging the respective abutment surface, each clamping member having a length greater than the length of the internal passage in which it is located; wherein the second leg part can be clamped relative to the first leg part by longitudinal adjustment of the locking member relative to the body portion to cause the abutment surfaces of the locking member to engage and slide over the respective abutment surfaces of the clamping members to urge said members towards their respective retaining holes and to thereby clamp the extension members in their respective retaining holes.

11. An extensible support leg as claimed in claim 10 wherein the locking member is floatingly located in the housing.

12. An extensible support leg as claimed in claim 10 wherein the locking member is of a trapezoidal shape and has at least two abutment surfaces forming the tapered sides thereof.

13. An extensible support leg as claimed in claim 10, wherein the clamping means includes shoes upon which the clamping members act to clamp the extension members.

14. An extensible support leg as claimed in claim 10, wherein the clamping member is floatingly located in the housing.

15. An extensible support leg as claimed in claim 14 wherein the clamping members are supported for relative rotation with respect to the shoes and the locking member such that longitudinal adjustment of the locking member causes rotational adjustment of the clamping members to abuttingly align the planar surfaces of the locking member and the clamping members.

16. An extensible support leg as claimed in claim 15 wherein each clamping member includes a spigot shaped to fit within a corresponding shaped recess in each shoe, there being a tolerance between the spigot and recess diameters to allow for relative rotation of the clamping members with respect to the shoes.

17. A portable stand or support comprising at least one extensible support leg as claimed in claim 1 or claim 10.

18. A tripod comprising three extensible support legs, each leg being as claimed in claim 1 or claim 10.

19. An extensible support leg for a portable stand or support comprising a plurality of pairs of parallel elongate leg members, each pair being arranged in two planes and each leg member in the second plane lying behind a respective leg member in the first plane such that the plane common to the axes of said leg member is perpendicular to the first and second planes, said leg members being extensible by sliding movement between pairs in respective first and second planes, and means for releasably locking the leg members in any desired position.

* * * * *